(12) United States Patent
Melosi

(10) Patent No.: US 8,613,841 B2
(45) Date of Patent: *Dec. 24, 2013

(54) ELECTROCHEMICAL THERMODYNAMO

(75) Inventor: Mario Melosi, Pavia (IT)

(73) Assignees: Paolo Ricotti, Capoliveri (IT); Annas S.R.L., Milan (IT); Hysytech S.R.L., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,555

(22) Filed: Sep. 13, 2011

(65) Prior Publication Data
US 2012/0052335 A1    Mar. 1, 2012

Related U.S. Application Data

(62) Division of application No. 10/578,548, filed as application No. PCT/EP2004/051207 on Jun. 23, 2004, now Pat. No. 8,034,220.

(30) Foreign Application Priority Data

Jun. 24, 2003  (IT) .............................. PV2003A0006

(51) Int. Cl.
C25B 1/12     (2006.01)
C25B 9/18     (2006.01)
C25B 15/08    (2006.01)

(52) U.S. Cl.
USPC .................... 204/270; 204/269; 204/275.1

(58) Field of Classification Search
None
See application file for complete search history.

(56) References Cited

U.S. PATENT DOCUMENTS 3,977,902 A * 8/1976 Sauer et al. ................ 429/6
8,034,220 B2 * 10/2011 Melosi .................... 204/270

* cited by examiner

*Primary Examiner* — Harry D Wilkins, III
(74) *Attorney, Agent, or Firm* — Abelman, Frayne & Schwab

(57) ABSTRACT

Electrochemical cells modules made up of couples of catalytic multilayer porous electrodes forming the anodes and the cathodes and delimitating external gaseous areas and internal areas containing the electrolyte wherein the pressure modulators, generating two pressure cycles independently synchronized but of opposite phase, act at the inlet and at the outlet of the electrolyte and the multilayer porous electrodes are weeping on the gas side. According to a preferred embodiment the multilayer porous electrodes are hydrophobic and conductive on the gas side, the conductive and catalytic middle layers are hydrophobic and hydrophilic, the non-conductive and non-catalytic layer on the electrolyte side is hydrophilic.

3 Claims, 2 Drawing Sheets

ELECTROCHEMICAL THERMODYNAMO

CROSS-REFERENCE TO RELATED APPLICATIONS

Figure 1:
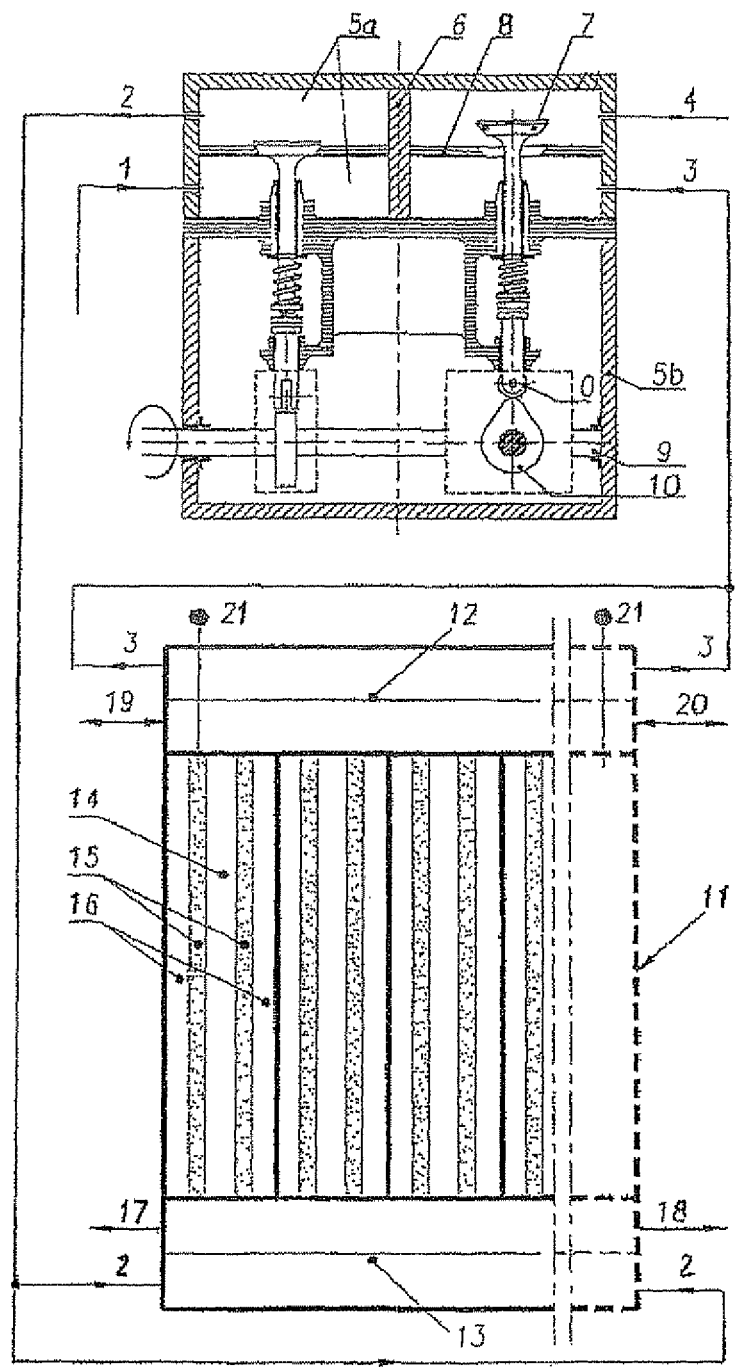

This is a divisional application of U.S. Ser. No. 10/578,548, filed Nov. 22, 2006, now U.S. Pat. No. 8,034,220, which is a National Phase of PCT/EP2004/051207, filed 23 Jun. 2004, which claims priority from IT No. PV2003A000006, filed 24 Jun. 2003, disclosures of which are all incorporated herein by reference.

FIELD OF THE INVENTION

The present invention generally relates to the field of the electrochemical cell. More particularly, the present invention relates to an electrochemical cell for water electrolysis and/or for the production of electricity using traditional technologies: the improvement increases the energetic yields.

BACKGROUND OF THE INVENTION

The exhaustion of fossil fuel reserves together with the environmental and climatic changes linked to their utilization has developed new technologies which will utilize the hydrogen as source of energy. The advantages are easily foreseeable using as energy source the sun, the renewable solar energy will be utilize to decompose the water in hydrogen and oxygen, hydrogen burns either in conventional engines or in fuel cells without pollutants emission to generate electric energy. Many technological aspects have still to be solved in order to implement this project, in particular case those referring to the transformation of solar energy into electric energy and its further use for production of hydrogen by water hydrolysis.

Presently, only 2% of the hydrogen produced comes from electrolytic processes, most of the hydrogen industrially produced comes from the hydro-reforming of fossil fuels or as industrial by-product of industrial processes such as oil refinery and PVC.

The electrolytic produced hydrogen has an high purity, but an high cog due both to the high cost of electric energy and to the low yield, i.e. low efficiency in the energy conversion from electric energy to the chemical energy.

The incentives to improve the efficiency of the electrolytic production of hydrogen are presently small: although the added value of high purity of electrolytic hydrogen would render the higher cost unimportant, such applications are rare and the use of hydrogen for the production of energy is uneconomical either for production of electrolytic hydrogen with high yields.

An improvement is expected from the continuous higher request of clean energy which foresees the use of hydrogen both for production of electric energy and for use in the automobiles industry. In the next decade the request of pure hydrogen will increase drastically, the need of more performing hydrogen production processes will be then evident, i.e. not only higher energetic yields but intrinsic safe run conditions and simple hydrogen distribution network.

In order to contribute to the development of systems which avoid the use of fossil fuels such as coal or natural gases, the choice of systems producing hydrogen from electrolysis of water is unavoidable. Environmentally friendly electric energy can only be produced using Aeolian systems, hydro-electric systems and finally using photovoltaic systems.

The energy sources of the first two systems are normally close enough to the site of further use of the electric energy whereas efficiency and quantity of electricity produced using the photovoltaic systems is higher in secluded parts of the hemisphere such as tropical and desert areas.

The photovoltaic system concentrates the solar energy and can attain up to 30% of electric conversion efficiency through the use of a dual converter, two semiconductors with different band-gaps, receiving different fraction of radiation. The produced photovoltaic electric energy can conveniently be used for the production of high purity hydrogen and oxygen by water electrolysis. The $H_2$ stored as a metal hybrid is conveniently transported to the site of use and production of electric energy.

A major goal in electro-conversion of solar energy is the use of electricity to produce $H_2$ and $O_2$ of high purity using water electrolysis, transporting the produced $H_2$ and $O_2$ to the utilization site and recombining them in a fuel cell for the production of electric energy. Consequently in order to minimize the energy losses there is the need of developing electrolysers and fuel cells of simple geometry and high efficiency, which can be simply adapted either as electrolyser or as fuel cell.

Besides the above described system, where large size electrolysers and fuel cells are foreseen, there is a need of developing technologies suitable for use in residential power system.

Alkaline electrolyser and alkaline cell based upon the technology of the alkaline fuel cells (AFC) were the most promising. These cells have been successfully used in the Apollo project and have the highest output voltage among fuel cells; furthermore, they may be operated over wide ranges of pressure and temperature. The technology behind the electrodes has been refined in the 1980's and uses low cost materials, C and Ni-mesh. The AFC needs pure gases in input which limited their application and the further development of this technology.

The AFC are competitive with polymeric electrolyte fuel cells (PEFC). The AFC advantageously does not need the presence of costly separation diaphragms or membranes, avoiding the known problems arising from their degradation, and of noble metals catalyzed primary electrodes.

The alkaline fuel cells advantageously use low cost, carbon/nickel-mesh porous electrodes which can effectively be employed in a modified cell working as electrolyser.

The alkaline fuel cells are easily polluted from the carbon dioxide contained in the hydrogen produced from the hydro-reforming of the fossil fuels. Such a problem does not exist when the hydrogen is produced from the water hydrolysis. The hydrogen can be then used in a fuel cell producing electric energy and closing the energy cycle of transformation of energy from electric energy into chemical energy and from chemical energy to electric energy with a total energy yield above the 50%.

The alkaline fuel cell are the type of fuel cells with higher yield, up to 65%, and able to work from room temperature up to 200° C. and at pressure up to 200 bar: this high flexibility allows the choice of the most suitable operative conditions either for optimize the total yields or for reduce the complexity and cost of the plants.

DISCLOSURE OF THE INVENTION

Scope of the present invention is the improvement of the yield of an electrochemical cell with porous electrodes able to be used either as electrolyser or as fuel cell. Unexpectedly, its has been found that by applying a pressure modulation to the electrolyte the yield improves up to 30% using the conventional cell with porous carbon/nickel-mesh electrodes.

According to first aspect of the present invention, there are provided electrochemical cells modules made up of couples of catalytic multilayer porous electrodes forming the anodes and the cathodes and delimitating external gaseous areas and internal areas containing the electrolyte wherein the pressure modulators, generating two pressure cycles independently synchronized but of opposite phase, act at the inlet and at the outlet of the electrolyte and the multilayer porous electrodes are weeping on the gas side.

According to a preferred embodiment the multilayer porous electrodes are of the conductive and hydrophobic type on the gas side, the conductive and catalytic middle layers are hydrophobic and hydrophilic, and a hydrophilic layer, non-conductive and non-catalytic, is on the electrolyte side.

Furthermore, the present invention provides the electrochemical process using the above described electrochemical cell according to which the gas is maintained at a pressure P up to 200 bar, the electrolyte pressure is varied stepwise between P+dP and P+dp by generating on the electrolyte positive pressure waves of amplitude dP and dp at the frequency f.

Further, embodiments of the present invention are herewith described and claimed in the dependent claims.

These and other objects, features and advantages of the present invention will become clearer from the following detailed description when read in conjunction with the accompanying drawings and the appended claims.

BRIEF DESCRIPTION OF TELE DRAWINGS

Figure 2:
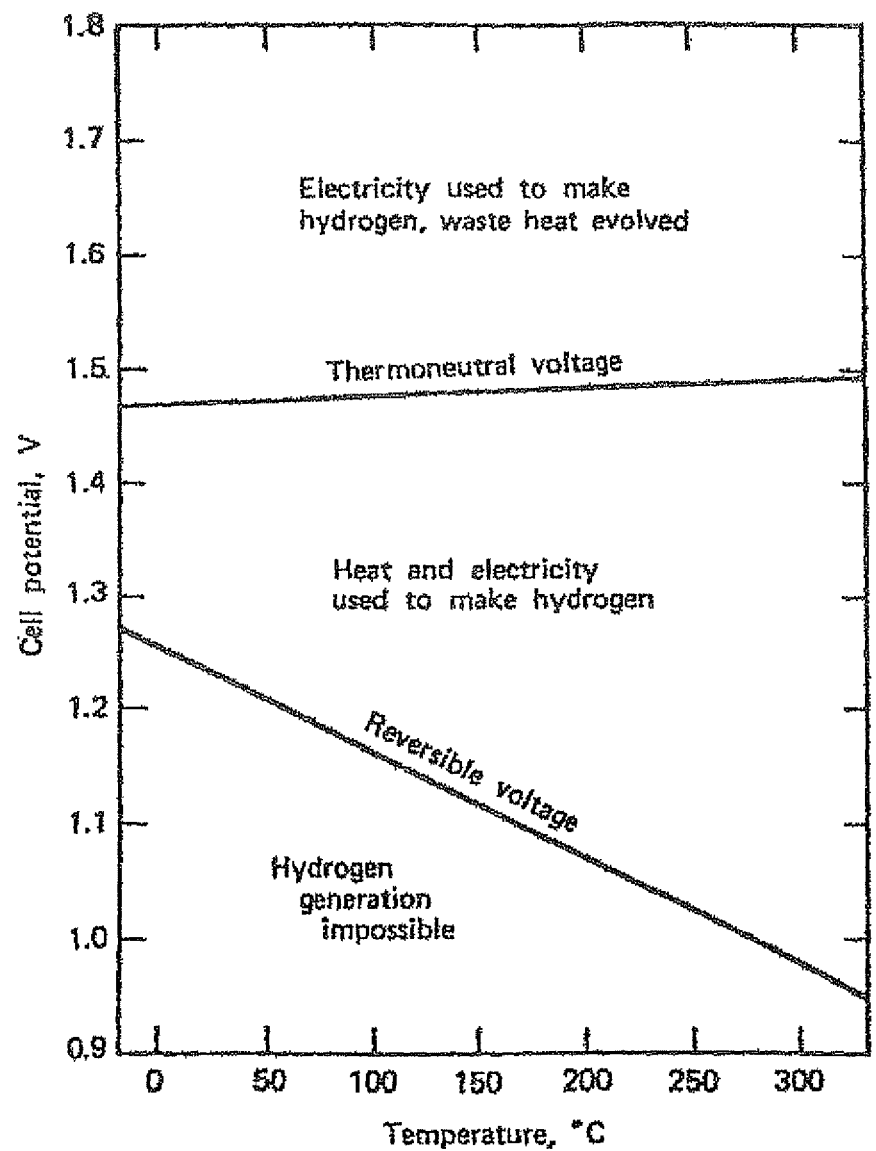

For a better understanding of the present invention, reference is made to a detailed description to be read in conjunction with the accompanying drawings in which:

FIG. 1—the electrochemical cells modules battery and modulators according to the invention FIG. 2—Hydrogen thermodynamic data

DETAILED DESCRIPTION OF ME PREFERRED EMBODIMENTS

Preferred embodiments of the electrochemical module according to the present invention are described in detail below by referring to the accompanying drawings.

Alkaline fuel cells use an electrolyte that is an aqueous solution of potassium hydroxide (KOH) retained in porous electrodes. The concentration of KOH can be varied with the fuel cell operating temperature, which ranges from 65° C. to 220° C. The charge carrier for an AFC is the hydroxyl ion (OH—) that migrates from the cathode to the anode where they react with hydrogen to produce water and electrons. Water formed at the anode migrates back to the cathode to regenerate hydroxyl ions. The chemical reactions at the anode and cathode in an AFC are shown below. This set of reactions in the fuel cell produces electricity and by-product heat.

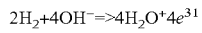  Anode Reaction:

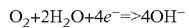  Cathode Reaction:

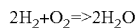  Overall Net Reaction:

In the alkaline electrolysis cell, this set of reactions uses electricity and adsorbs heat:

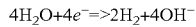  Cathode Reaction:

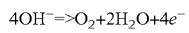  Anode Reaction:

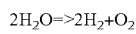  Overall Net Reaction:

In the prior art Alkaline Fuel Cell (AFC) or alkaline electrolysis cell (ABC) the aqueous solution of potassium hydroxide (KOH) electrolyte circulates between the porous gas-electrodes.

We define as <<Electrochemical Thermoclynamo>> ETC the electrochemical cell that can, without particular changes, work either as fuel cell or electrolysis cell, with the combined effect brought by the heat exchange inside of the porous electrodes between the fluctuating electrolyte and the catalytic active centers because of the pressure pulses: the so called thereto-dynamic electrochemical process.

FIG. 1 shows an Electrochemical Thermodynamo according to the invention. A battery of modules of bipolar cells 11 is represented. Each module is formed of a couple of porous electrodes (15) defining three zones, one filled with electrolyte (14) and the other two (16) external to the electrodes filled with gas at the same pressure P. On the frame of the battery anodic and cathodic gas adduction ducts (19, 20) are depicted. The porous electrodes (15) are of the weeping type and the drops are drawn from the ducts (17, 18) and recycled back to the electrolyte circuit. Two duets (2, 3) in connection with the electrolyte inlet and outlet are shaped on the frame. Numeral (21) refers to the electrical connection to the electric circuit.

The valves pressure modulators are schematically represented on the top of the figure.

The modulators are moved by a not drawn external motor for the circulation of the electrolyte into the electrochemical cells modules through the feeding pipes (1 and 2), the draining pipes (3 and 4).

The rotating shaft (9) moves the cams (10) which work through the followers (0) of the tappet rods on the fungus heads of the valves (7) with return springs so that when a valve is open the other is closed and vice versa.

Numerals (1) and (4) indicate respectively the electrolyte inlet and outlet, connected to two tanks at pressure P+dP and P+dp, respectively. The modulators define two parts (5a—electrolyte, 5b—oil): the part 5a has two chambers separated by a vertical septum (6) and each chamber, in electrolytic ambient, has two volumes one lower and one higher intercommunicating that are separated by bored plate (8) and connected through the valve (7). In the depicted embodiment the mechanical system opens and closes the valves alternatively, creating the alternating pressures which transmit waves to the cells modules. The electrolyte flows in the prior art EC or PC at constant flow rate. According to the present invention in an ETC the flow rate is varied by modulating the pressure of the electrolyte. The electrodes of an ETC are those known in the art. They are porous and formed in sandwich multilayer assembly, by juxtaposition and heat sinterised under pressure, on a metallic mesh which will later constitute the electric conductor. The mesh is to be found on the gas side. The different layers present hydrophobic layers with macro-porous and micro-porous matrix containing hydrophilic metal-catalytic clusters. The electrodes constituents can be for instance mixtures of carbon powders and PTFE (politetrafluorineethylene) or similar binders. The ratio binders/carbon powders is higher in the layers close to gas side and the metallic mesh connectors and lower on the side of the alkaline electrolyte, where the layers are richer in carbon catalytically activated by metals and compounds known in the art. The electrodes, used for the AEC, further present for both cathode and anode on the electrolyte side a non-conductive and non-catalytic, preferably hydrophilic, layer. The porous electrodes are weeping at the gas side in the form of drops. The electrolyte drops are recycled into the electrolytic cell.

The pulsating flow of the electrolyte within the porous electrodes is produced by two opening/closing valves operating on the inlet and in the outlet of the electrolyte to/from a module or to/from the cells modules battery.

Considering P the pressure of the gases at the anode or cathode side, the valve at the electrolyte inlet side produces an overpressure p+dP and alternatively the valve at the electrolyte outlet side an overpressure p+dp, where dP>dp.

The electrolyte, exhibiting the intrinsic incompressibility property of the liquids, transmits instantaneously to the electrolyte, within the electrodes, the pressure waves. The waves act in every direction and particularly towards the porous electrodes.

The explanation of the innovation advantages can be based on a microscopic model of the standard process occurring at the electrode, where the main potential drop, diffusion polarization and charge transfers, are due to the bubbles formation near the reaction centers; in the innovation the flow of electrolyte through the active sites decreases these phenomena and increases the efficiency of the electrochemical cell.

Further, the electrolysis of the water is an endothermic reaction; the active centers, particularly where oxygen evolves, become cold-spots, which hinder the oxygen evolution. Advantageously, due to the pressure modulation, the heat exchange takes place between cold-spots and the electrolyte flowing through the pores, the temperature distribution throughout the porous electrodes is improved, i.e. permanence of the isothermic materials structures, together with the electrode average life.

According to a further embodiment of the invention there is a heat supply to the cell, heat as external source. Accordingly, part of the energy needed by the water electrolysis is supplied by the direct transformation of heat into chemical energy. The mechanical energy dissipated for assuring an effective pressure modulation is unimportant compared to the electrical and energetic yield increases and the improvement of the electrodes lives.

Advantageously, the electrochemical cell according to the invention can be utilized, without substantial changes of the cell geometry and electrode constitution, either in an electrolyser or in a fuel cell. The electrodes for the electrolysis cell present on the electrolyte side additionally a porous layer preferably hydrophilic, non-conductive and non-catalytic.

FIG. 2 represents the diagram of the hydrogen thermodynamic data, i.e. hydrogen production by electrolysis as function of the temperature. For voltage above the thermo-neutral potential, which varies only slightly with the variation of temperature, the electrolysis occurs with heat evolution, heat which must be taken away; whereas for voltage within the thermo-neutral line and the reversible potential line the production of hydrogen occurs by adsorbing both heat and electricity.

Contrary during the water synthesis in a fuel cell the low solubility of $H_2$ and $O_2$ in the electrolyte decreases their concentration and hinders their migration towards the reaction centers especially on the cathodes hot spots where the $O_2$ reduces to $OH^-$ and migrates towards the anodes to react with the hydrogen oxidized to form water. The overall transformation of chemical energy into electric energy is hindered and consequently the yield of the fuel cell decreases.

The electrochemical cell according to the invention cools the hot-spots since it solves this problems by applying on the electrolyte side an overpressure dP (the gas side has the working pressure P) followed by an overpressure dp lower than dP. The higher overpressure dP, acting on the electrolyte, causes the flow of the electrolyte towards the interior of the porous electrode, crossing at the beginning the hydrophobic macro- and micro-porosities and further flowing into the hydrophilic metal catalytic clusters. During part of the cycle at lower overpressure dp the electrolyte flows back, as the result of the hydrophobic capillary forces and of the hydraulic phenomena of the hydrophilic catalytic clusters. The two overpressures are applied for angular cycles of length $\tau_p$ and $\tau_2$ where $\tau_P < \tau_p$ at the frequency $f=1/T$ where $T=\tau_P+\tau_p$.

Though the pressure pulses of the electrolyte increases the quota of energy which goes to useful work in both Electrolysis, conversion of electric energy to chemical energy, and Synthesis, conversion of chemical energy to electric energy.

The electrolyte fluctuations inside of the porous electrodes determine volumes for the heterogeneous catalytic reactions that drop the electrodic overvoltages, improve the kinetics while the electrodes are quite isothermic.

According to the invention, under dynamic pressure conditions a catalytic electrode volume has been generated, which replaces the interface of the three phases of the static process and determines the anodic activation (heat supply for the electrolysis) and cathodic activation (cold supply for the synthesis).

The heat exchange is concerning the catalytic metal clusters of the $O_2$-porous electrodes where the entropy variation heats are very much greater than the $H_2$-porous electrodes and where the electrodic overvoltages are big in the static process.

The innovation improves the catalytic activity and kinetic enhancement of the electrochemical reactions.

In the process according to the invention the frequency of the pressure modulation varies between few Hertz up to some tens of Hertz, in the range from 1 to 50/60 Hz, whereas the pressure difference dP–dp, in the inter-electrodic space, varies from 1 meter up to some tens of meters of liquid beads, in the range from 1 to 30 m.

The electrodes are porous carbon based and there are some examples: the porosity varies around 1-10 nm for the transport hydrophilic layers at the electrolyte side as well as around 1-20 Inn for the diffusive and transport hydrophobic layers at the gas side onto the metallic mesh of current distribution. The intermediate catalytic layers have hydrophobic and hydrophilic micro-porosities 0.1-1 nm, whereas the catalytic and hydrophilic porosities have dimensions around 0.01-0.005 nm, where is concentrated mostly the total catalytic surface. The electrodes are produced by synterising carbon powders, which have been previously activated with catalytic metals or compounds known in the art and consequently brought together with PTFE or similar binders using process known in the art and described in International L Hydrogen Energy, Vol. 10, No. 5, pp. 317-324, 1985.

With the low cost carbon electrodes according to the invention the produced or consumed current is limited to 0.2-0.3 $A/cm^2$ (technical current) in order to maximize the energy quota which goes to useful work.

The electrodic current can be higher than the technical current and the delivered voltage in the fuel cell increases up to 0.9 V when a pressure modulation is applied to the cell, whereas for the equal value of current density the voltage in the same fuel cell, without pressure modulation, is of 0.7 V.

Analogously, in the electrolyser according to the invention working at the equal current density the applied voltage decreases from 1.9 V for the static process down to 1.4 V with the dynamic functioning electrolyser, which indicates that the electrolysis occurs by both heat consumption and electric energy according to the diagram of FIG. 2.

The electric yield (EL.Y) is respectively the ratio $V_{cell}/E_{rev}$ for the fuel cell—AFC and $F_{rev}/V_{cell}$ for the electrolysis cell—AEC and the energetic yield (EN.Y) is the ratio $V_{cell}/V_{hhv}$, for the AFC e $V_{hhv}/V_{cell}$ for the AEC where $V_{hhv}$ equals the thermo-neutral potential.

The maximum energetic yield for the thereto-assisted electrolysis at 25° C., being $V_{hhv}$=1.48V and $E_{rev}$=1.23V is:

$$EN.Y = V_{hhv}/E_{rev} = 120\%$$

At 80° C. $V_{hhv}$=1.49V and $E_{rev}$=1.18V and the above indicated data give the results:

|      | $FC_s$    | $FC_d$   | $EC_s$    | $EC_d$    |
|------|-----------|----------|-----------|-----------|
| EL.Y | from 59%  | to 76%   | from 62%  | to 84%    |
| EN.Y | from 47%  | to 60%   | from 78%  | to 106%   |

Where subscripts <<s>> and <<d>> stand for static process and dynamic process.

In the dynamic electrolysis process the voltage drops to 1.4 Volt and the consumption of electric energy is $$1.4 V \times 53.604 \text{ Ah}/22.4 \text{ Nm}^3 = 3.35 \text{ KWh/Nm}^3 H_2$$

In the static electrolysis process the voltage increase up to 1.9 Volt and the consumption of electric energy is:

$$1.9 V \times 53.604 \text{ Ah}/22.4 \text{ Nm}^3 = 4.55 \text{ KWh/Nm}^3 H_2$$

In the dynamic electrolysis process the energy consumption drops more than 1 KWh/Nm$^3$ $H_2$, in other words the efficiency increases of 35% and the overall conversion of electric energy into chemical energy is higher than 80%. The electrolysis occurs because of the combined action of heat and electric energy supply.

Analogously, the fuel cell with the delivered voltage of 09 V gives:

$$0.9 V \times 53.604 \text{ Ah}/22.4 \text{ Nm3} = 2.15 \text{ Kwh/Nm3H2}$$

In the dynamic fuel cell the energy conversion efficiency increases of 28% and the conversion of chemical energy into electric energy reaches the 75%.

The total cycle of the conversion from electrical to chemical energy and back has the EL.Y of 64%

The electrochemical cell according to the invention can advantageously be used either as electrolyser or as fuel cell using the same low cost electrodes which show a higher durability. The cell according to the invention has intrinsic security due to the higher pressure at the electrolyte side with regards to the gas side of the porous electrodes because of the hydrophobic character of the electrodes and the cell is intrinsically safe and does not necessitate the use of costly membranes or diaphragms for separating anodes and cathodes. A software program commands the timing of the pulses modulator at the frequency "f" and controls the electrolytic overpressures difference "dP–dp". A data acquisition board does all data logging including the electrical quantifies in order to optimize the power and the energy quota which transforms into useful work in agreement with the needs of the plant. The dynamic modulation of the electrolyte within the pores of the electrodes increases the efficiency of the electrochemical cell since the contact time of the multi-phase interface gas+liquid+solid active centers is approaching the reaction times of the electrochemical reactions. The heat exchange within the porosity of the electrodes has improved and the decrease of cold- or hot-spots has enhanced the life of the electrodes; the specific reactive surface per volume unity is increased and the mass transport of reactants and reaction products is superior.

The electrochemical cells according to the invention can be advantageously integrated in the present energy production systems which produce heat as waste by-product, such as the nuclear and conventional thermo-generating energy plants. This waste heat can be used as heat source in the electrolysis cells according to the invention increasing the overall energy yield.

In the world that changes the scenarios are manifold with the presence of nuclear energy and petrol.

Analogously, the surplus electric energy produced by the power stations in off-pick hours can be used in a bi-functional Electrolysis/Synthesis plant according to the invention, which turns out the surplus energy into hydrogen and oxygen directly at high pressure, that can be used, when needed during the pick hours, to generate electric energy using the fuel cells according to the invention.

Further, it is foreseen its use in residential energy systems with zero emissions, based on the solar energy, photovoltaic and thermal panels and on the use of hydrogen as energy vector. This system is capable to work either connected to an electric network or locally to realize a simple hydrogen's production and distribution.

The invention puts together Electrochemistry & Electronics realizing the energy savings either in the chemical industry, in the automotive industry, in the residential power generation and in the nuclear and thermo power generators through the above described enhanced use of heat.

The invention claimed is:

1. Electrochemical cells modules made up of couples of catalytic multilayer porous electrodes forming the anodes and the cathodes and delimitating external gaseous areas and internal areas containing the electrolyte and connected by an external electric circuit characterized in that the cell module comprises:
   a circulating electrolyte,
   pressure modulators generating in use two pressure cycles independently synchronized but of opposite phase acting at the inlet and at the outlet of the circulating electrolyte,
   multilayer porous electrodes weeping on the gas side, and
   external heat exchange for the circulating electrolyte fluctuating into porous electrode and flowing into the electrochemical cell
   wherein the multilayer porous electrodes are conductive and hydrophobic on the gas side, the conductive and catalytic middle layers are hydrophobic and hydrophilic, and a non-conductive, non-catalytic, hydrophilic, layer is on the electrolyte side,
   wherein the pressure modulators are linked with two tanks containing in use the electrolyte at two different pressures and each connected respectively at the inlet and at the outlet of the cell by a valve;
   wherein the opening section of the outlet valve S and of the inlet valve s are such that S>s,
   and wherein the two pressure cycles are applied at a frequency the period of which approaches the reaction times of the electrochemical reactions.

2. The electrochemical cell according to claim 1, wherein the pressure modulators modulate in use at a frequency the period of which approaches the reaction times of the electrochemical reactions.

3. The electrochemical cell according to claim 2, wherein the electrolyte is an aqueous solution of KOH, electric energy is drawn from the porous electrodes by feeding the gas sides of the electrodes with, respectively, $H_2$ and $O_2$.

* * * * *